US012675107B2

(12) United States Patent
Zach

(10) Patent No.: US 12,675,107 B2
(45) Date of Patent: Jul. 7, 2026

(54) FLIGHT MANAGEMENT SYSTEM FOR UAVS

(71) Applicant: LogiCom & Wireless Ltd., Hod Hasharon (IL)

(72) Inventor: Moshe Zach, Hod Hasharon (IL)

(73) Assignee: LogiCom & Wireless Ltd., Hod Hasharon (IL)

( * ) Notice: Subject to any disclaimer, the term of this patent is extended or adjusted under 35 U.S.C. 154(b) by 128 days.

(21) Appl. No.: 18/642,810

(22) Filed: Apr. 22, 2024

(65) Prior Publication Data

US 2026/0010156 A1 Jan. 8, 2026

Related U.S. Application Data

(63) Continuation of application No. 18/199,600, filed on May 19, 2023, now Pat. No. 12,061,473, which is a
(Continued)

(51) Int. Cl.
*G05D 1/00* (2024.01)
*B64C 39/02* (2023.01)
(Continued)

(52) U.S. Cl.
CPC ......... *G05D 1/0022* (2013.01); *B64C 39/024* (2013.01); *B64U 10/00* (2023.01);
(Continued)

(58) Field of Classification Search
CPC .. G08G 5/26; G08G 5/30; G08G 5/32; G08G 5/55; G08G 5/56; G08G 5/57; G08G 5/59;
(Continued)

(56) References Cited

U.S. PATENT DOCUMENTS

| | | |
|---|---|---|
| 6,795,772 B2 | 9/2004 | Lin et al. |
| 6,799,094 B1 | 9/2004 | Vaida et al. |
| (Continued) | | |

FOREIGN PATENT DOCUMENTS

| | | |
|---|---|---|
| CN | 104071333 A | 10/2014 |
| EP | 2138921 A2 | 12/2009 |

OTHER PUBLICATIONS

PCT International Search Report for International Application No. PCT/IL2016/050126, mailed May 16, 2016, 5pp.
(Continued)

*Primary Examiner* — Mussa A Shaawat
(74) *Attorney, Agent, or Firm* — The Roy Gross Law Firm, LLC; Roy Gross

(57) ABSTRACT

A flight management system for unmanned aerial vehicles (UAVs), in which the UAV is equipped for cellular fourth generation (4G) flight control. The UAV carries on-board a 4G modem, an antenna connected to the modem for providing for downlink wireless RF. A computer is connected to the modem. A 4G infrastructure to support sending via uplink and receiving via downlink from and to the UAV. The infrastructure further includes 4G base stations capable of communicating with the UAV along its flight path. An antenna in the base station is capable of supporting a downlink to the UAV. A control centre accepts navigation related data from the uplink. In addition, the control centre further includes a connection to the 4G infrastructure for obtaining downlinked data. A computer for calculating location of the UAV using navigation data from the downlink.

20 Claims, 2 Drawing Sheets

Related U.S. Application Data continuation of application No. 17/874,015, filed on Jul. 26, 2022, now Pat. No. 11,693,402, which is a continuation of application No. 17/098,393, filed on Nov. 15, 2020, now Pat. No. 11,449,049, which is a continuation of application No. 16/451,172, filed on Jun. 25, 2019, now Pat. No. 10,877,472, which is a continuation of application No. 15/544,006, filed as application No. PCT/IL2016/050126 on Feb. 3, 2016, now Pat. No. 10,372,122.

(60) Provisional application No. 62/111,764, filed on Feb. 4, 2015.

(51) Int. Cl.

| | |
|---|---|
| *B64U 10/00* | (2023.01) |
| *G05D 1/223* | (2024.01) |
| *G08G 5/26* | (2025.01) |
| *G08G 5/30* | (2025.01) |
| *G08G 5/32* | (2025.01) |
| *G08G 5/55* | (2025.01) |
| *G08G 5/56* | (2025.01) |
| *G08G 5/57* | (2025.01) |
| *G08G 5/59* | (2025.01) |
| *G08G 5/72* | (2025.01) |
| *G08G 5/80* | (2025.01) |
| *H04L 12/64* | (2006.01) |
| *B64U 101/21* | (2023.01) |

(52) U.S. Cl.
CPC ............... *G05D 1/223* (2024.01); *G08G 5/26* (2025.01); *G08G 5/30* (2025.01); *G08G 5/32* (2025.01); *G08G 5/55* (2025.01); *G08G 5/56* (2025.01); *G08G 5/57* (2025.01); *G08G 5/59* (2025.01); *G08G 5/727* (2025.01); *G08G 5/80* (2025.01); *H04L 12/6418* (2013.01); *B64U 2101/21* (2023.01); *B64U 2201/20* (2023.01)

(58) Field of Classification Search
CPC ........ G08G 5/727; G08G 5/80; B64C 39/024; G05D 1/0022; H04L 12/6418; B64U 2201/20
See application file for complete search history.

(56) References Cited

U.S. PATENT DOCUMENTS

| | | | |
|---|---|---|---|
| 6,820,006 B2 | 11/2004 | Patera | |
| 6,873,903 B2 | 3/2005 | Baiada et al. | |
| RE39,053 E | 4/2006 | Rees | |
| 7,024,309 B2 * | 4/2006 | Doane | G01S 19/49 701/120 |
| 7,194,353 B1 * | 3/2007 | Baldwin | G09B 9/003 701/528 |
| 7,212,917 B2 | 5/2007 | Wilson, Jr. | |
| 7,306,187 B2 | 12/2007 | Lavan | |
| 7,492,307 B2 * | 2/2009 | Coulmeau | G08G 5/25 342/29 |
| 7,516,014 B2 * | 4/2009 | Hammarlund | G08G 5/25 340/961 |
| 7,630,829 B2 | 12/2009 | Pepitone | |
| 8,060,295 B2 * | 11/2011 | Estkowski | G05D 1/104 340/961 |
| 8,909,391 B1 * | 12/2014 | Peeters | G07C 5/006 709/201 |
| 9,477,226 B2 * | 10/2016 | Olson | H04B 7/18504 |
| 9,864,372 B2 | 1/2018 | Chen et al. | |
| 2002/0152029 A1 | 10/2002 | Sainthuile et al. | |
| 2003/0122701 A1 | 7/2003 | Tran | |
| 2003/0193409 A1 | 10/2003 | Crank | |
| 2004/0078136 A1 | 4/2004 | Cornell et al. | |
| 2004/0193362 A1 | 9/2004 | Baiada et al. | |
| 2005/0156777 A1 | 7/2005 | King et al. | |
| 2006/0021880 A1 * | 2/2006 | Sandoval | C25C 1/12 205/576 |
| 2006/0184292 A1 * | 8/2006 | Appleby | F41H 13/00 701/2 |
| 2006/0224318 A1 | 10/2006 | Wilson et al. | |
| 2007/0078600 A1 | 4/2007 | Fregene et al. | |
| 2007/0106473 A1 * | 5/2007 | Bodin | G08G 5/55 701/3 |
| 2007/0150127 A1 | 6/2007 | Wilson, Jr. et al. | |
| 2008/0255711 A1 | 10/2008 | Matos | |
| 2009/0247204 A1 * | 10/2009 | Sennett | H04W 16/14 455/512 |
| 2010/0121574 A1 * | 5/2010 | Ariyur | G08G 5/21 701/301 |
| 2014/0018979 A1 * | 1/2014 | Goossen | G05D 1/0016 701/3 |
| 2016/0266579 A1 * | 9/2016 | Chen | G05D 1/0044 |
| 2020/0059725 A1 * | 2/2020 | Maly | G01T 7/125 |

OTHER PUBLICATIONS

PCT Written Opinion for International Application No. PCT/IL2016/050126, mailed May 16, 2016, 7pp.
PCT International Preliminary Report on Patentability for International Application No. PCT/IL2016/050126, completed Jul. 13, 2017, 22pp.

* cited by examiner

FLIGHT MANAGEMENT SYSTEM FOR UAVS

CROSS-REFERENCE TO RELATED APPLICATIONS

This application is a continuation of U.S. patent application Ser. No. 18/199,600, filed May 19, 2023, which is a continuation of U.S. patent application Ser. No. 17/874,015, filed Jul. 26, 2022, now U.S. Pat. No. 11,693,402, which is a continuation of U.S. patent application Ser. No. 17/098, 393, filed Nov. 15, 2020, now U.S. Pat. No. 11,449,049, which is a continuation of U.S. patent application Ser. No. 16/451,172, filed on Jun. 25, 2019, now U.S. Pat. No. 10,877,472, which is a continuation of U.S. patent application Ser. No. 15/544,006 filed on Jul. 16, 2017, now U.S. Pat. No. 10,372,122 which is a National Phase of PCT Patent Application No. PCT/IL2016/050126, having International filing date of Feb. 3, 2016, which claims the benefit of priority of U.S. Provisional Patent Application No. 62/111, 764, filed Feb. 4, 2015, the contents of which are all incorporated herein by reference in their entirety.

TECHNICAL FIELD

The present invention is in the field of aviation control. More specifically the control of unmanned aviation vehicle flight and cellular networks.

BACKGROUND ART

The usage of UAVs is growing steadily. Mission spectrum is wide and keeps widening, a typical list of missions includes: reconnaissance, military targeting and attack, fire control, and parcel delivery. Currently commercial UAVs require special wireless links to control their flight, each such link may not be geographically sufficient to cover the entire flight path, rather, it provides for a limited section of the path. Typically only a few miles are supported by the link, usually requiring line of sight to the UAV.

While the UAV typically communicates with a wireless ground stations, the human controller is connected to ground stations via a ground network. If the ground station is part of a nationwide system of control stations that coordinate with each other, there is a possibility of a smooth handover of UAV from one ground station to next. An alternative scenario is that of a controller directly communicating with the UAV via a wireless link.

An issue associated with UAV flight control, is the lack or lesser interaction of these aerial vehicles with the general flight control. The weight of UAVs is often less than 25 kgs, and for this and various other reasons their tracking by many radar system is not facilitated. This not only indicates a lack of possibility to control flight using common tracking systems but the hazard that such vehicles pose to civilian, military air traffic, other UAVs and objects on the ground through actual collision or otherwise intervention in flight courses.

DISCLOSURE OF THE INVENTION

As the bottleneck in UAV communications (uplink and downlink) is the struggle for bandwidth, it is maintained that the deployment and use of generation 4.0 (known as 4G) and above is to provide a viable data link for UAV flight path control and optionally additional tasks. 4G infrastructure is now being implemented worldwide.

Figure 1:
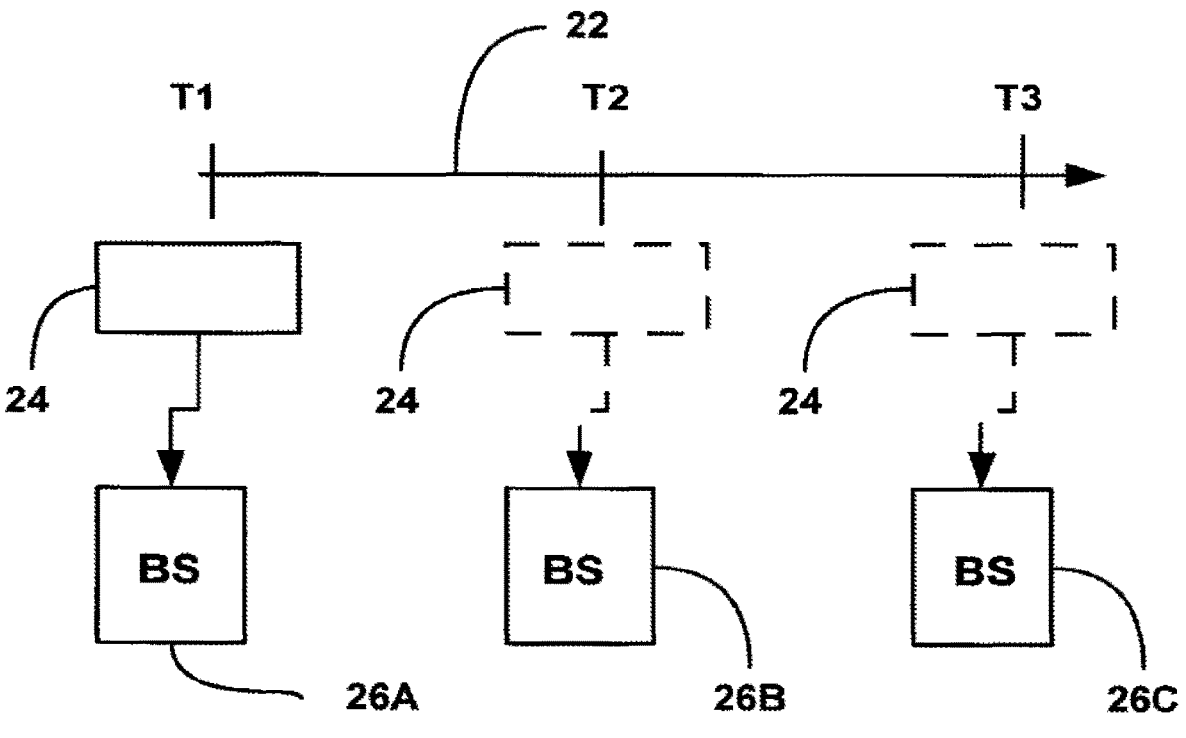
FIG. 1 is a schematic diagram of a general flight path with ground station support.

In accordance with the present invention, a UAV flies along a flight path while using the cellular 4G infrastructure to implement the mission control. As can be seen in FIG. 1, flight path 22 which also represents a time line is the path along which UAV 24 flies or is intended to fly at time T1, T2 and T3. At T1 base station (BS) 26A intercommunicates with UAV 24, at time T2 BS 26B replaces 26B and at time T3 BS 26C replaces 26B. In comparison with control system of the prior art, the BSs attending to the flight control of the UVA in accordance with the present invention, come in lieu of the customary ground stations.

Figure 2:
FIG. 2 is a schematic diagram of a UAV with data link.

The complete data path is shown schematically in FIG. 2. UAV 24 uses data link 32 to connect with flight control centre 34. The data link in accordance with the present invention is embodied in 4G infrastructure employing compatible modems on the UAV.

Minimal Network Properties Required

In order to fulfill the task in accordance with the present invention, cellular infrastructure of the $4^{th}$ generation (known also as 4G) and above is used to provide the data link to the UAV. Properties of the 4G system are defined by ITU's International Mobile Telecommunications Advanced program (IMT-Advanced program). The ITU stands for International Telecommunication Union, which is an agency of the UN.

On-Board H/W Components of a UAV Accommodated for Mission

Figures 3, 4:
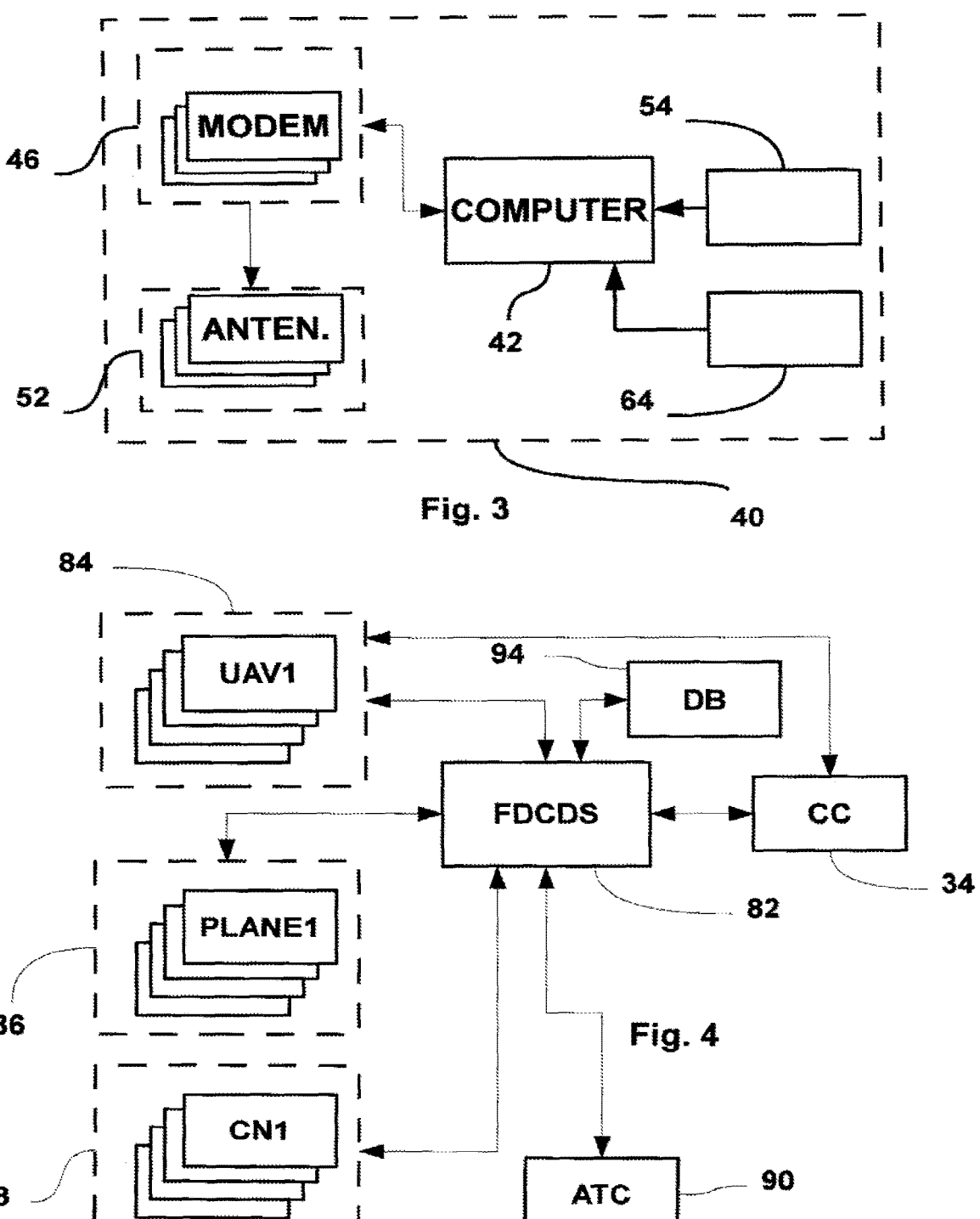
FIG. 3 is a schematic description of the major components with which a UAV for implementing the present invention is equipped.
FIG. 4 is a schematic diagram showing the interconnection of a flight data collection and distribution server.

Schematically shown in FIG. 3, UAV 40 carries on board computer 42 connected to one or more cellular modems 46, these modems are operational with 4G cellular network. An example of 4G modem is Netgear AT&T Aircard 34OU 4G USM which is an LTE (long term evolution) modem. To these one or more modems, one or more cellular antennae 52 are connected, to provide RF to the downlink and/or as uplink receiving antennae for each of the modems. Box 54 represents hardware payload elements, typically sensors that provide navigational information to be downlinked to the flight control centre. LTE advanced and Mobile Wimax communication standards are considered as complying with the 4G requirements. Navigational information derived from on-board inertial sensors (gyroscopes and accelerometers) can be used to navigate the UAV in case of a total failure of the supporting cellular network, or a failure in receiving data from the GPS satellites. Navigational information can be derived from the signal of the supporting cellular network, which may be very important if signal from the GPS satellites is insufficient. The cellular network can identify the location of the UAV as by at least two base stations and as "triangulation" algorithm in order to provide the location of the UAV.

Providing for UAV Related Uplink and Downlink Data

In order to control the UAV in its flight path, downlink is required to send commands and flight parameters to the UAV. In the other direction, uplink data is transmitted to the control centre to provide navigation related data collected in the UAV, and which is relevant for the analysis of the compliance of the UAV with the path. Such data is for example, telemetry, GPS data collected by on-board GPS receiver and on-board inertial data, these are represented by box 54. The collected data all or part of the collected data from the sensors can be uploaded to the internet cloud as IoT (Internet of Things) data. The uplink and downlink data from or to the UAV can be sent to more than one end point. Such data as payload data as video stream that is sent from the UAV camera or data as the UAV flight parameters data can be sent to more than one end point via the 4G infrastructures to different working stations or even to personal devices as Smart phones, tablets (with 4G modems) directly or indirectly and simultaneously. In the other direction, it is possible that the driving control and flight management of the UAV can be done in parallel from different End Points of the 4G infrastructures but coordinated between the UAV remote pilots so in definite moment only one is the main UAV remote pilot that actually drives the UAV. For example, more than one person can drive and control the UAV at specific time but at any moment the UAV driving control can be switched to a different person connected to different end point, receiving the same flight parameters and other payload data of the UAV simultaneously.

UAV Payload Data and Uplink for Transmitting Same

In addition to the control and flight management, another aspect of the present invention is to do with a payload uplink, specifically not associated with the data related to the flight management. The uplinked data of this category relates to another aspect of the present invention, implemented through the 4G infrastructure discussed above. Box 64 represents hardware payload elements, typically sensors that provide information to control centre 34 or to another data collecting facility. An inconclusive list of such sensors include optionally video camera/s, thermal IR camera/s (known also as FLIR), and RADAR. Other sensors which may be of use are thermometers, pressure gages, humidity gages and other meteorological and other environmental sensors. Payload data from such sensors can be loaded to the internet cloud for various data analysis agencies while the UAV is on mission or after.

BS and On-Board Antennae

BS antennae are typically Omni-directional. However for the sake of the purpose described in the present disclosure, directional antenna can be used to point at some angle upwards.

The adaptation of the UAV to the implementation of cellular networks connectivity includes the on-board antennae as well. In order to extend the effective distance of a UAV from the cellular BS, two types of antennae can be used in a complementary manner which will be described below. The two types of antennae in this case are omni-directional antenna and unidirectional antenna.

In this aspect of the invention, the omni-directional antenna can be used to search for the strongest emitting antenna of a BS. After detection of the strongest antenna, the unidirectional antenna can be directed to the same antenna in order to acquire the signal from same antenna.

The unidirectional antenna then locks on the direction of the cellular BS antenna so the higher gain of the unidirectional antenna enables the detection of weaker signals and by that extend the UAV range from the BS.

This aspect of the invention can contribute to the quality of service (QoS) with respect to the UAV. This aspect of the invention is expected to increase the QoS in problematic locations for example where a BS is at a suboptimal distance, and in places in which BS is of poor coverage and in general where the received signal is weak.

The omni-directional antenna can continuously search for alternative BSs signals. Thus, if a signal has become weak or lost altogether, rendering the unidirectional antenna ineffective, the omni-directional antenna is switched back to keep the connection with the wireless link albeit a different BS, providing a better signal.

A Plurality of SIM (Subscriber Identity Module) Cards

In another aspect of the present invention, the one or more modems on-board the UAV may contain each one or more SIM cards. This enables the UAV to shift from one to another cellular network in order to increase the robustness of the communications system. Moreover, it becomes possible for the UAV to use a plurality of networks at once thereby increasing effective bandwidth.

Quality of Service for the UAV

Flight control traffic for UAVs over 4G, must have ensured bandwidth and network access. There are several supporting measures that can be taken in order to keep the QoS above a defined threshold. One such measure is discussed above with respect to the use of two antenna types. One other measure is discussed below in the context of an auxiliary UAV. Another measure is the implementation of a virtual mobile network, similar to the MVNO (mobile virtual network operator) also known as Molo (mobile other licensed operator), in which the infrastructure, typically BS are licensed to an operator other than the proprietor of the infrastructure. Such technological/legal operative, it would be practical to allocate a portion of the infrastructure use to a UAV operator under agreement, in which case the QoS would be more under control of the UAV operator. By definition such a virtual network operator may dedicate the network solely for the use in accordance with the present invention. Another aspect of supporting measures for the flight/mission is discussed below under the header of flight plan below.

In order to use the frequencies bandwidth optimally in the cellular infrastructures including the base stations, the system is to dynamically allocate the bandwidth of the cellular network and its base station. For example if there is a demand for additional bandwidth for confirmed UAVs flight plans, more of the frequencies bandwidth will be dedicated for the UAVs network with a lesser frequencies bandwidth being allocated for the primarily mobile phone wireless network. Such a dynamic allocation of the frequencies bandwidth can be managed as by the cellular infrastructures management system.

Participation of More than One UAV in a Mission

In addition to the UAV carrying out a certain mission, other UAV/s may be involved in the same mission. An auxiliary UAV (AUAV) may be employed to extend the cellular network participating in the mission. For example, a AUAV can carry on-board the amount of H/W required for creating a microcell, the AUAV may assist in the UAV providing the mission, to extend geographical limitations of the cellular system interacting with the UAV, or in keeping a QoS definitions in control, essentially as the microcell created by the AUAV is to serve the UAV exclusively. The notion of picocell in this context is theoretically possible but then the two UAVs will have to keep very close in order for the connections to take place.

Flight Plan

Since this term has formal connotations, as a formal plan presented to the flight control authorities by the flier of a plane, the term is used hereinafter in a more loose sense than is usually used in the context of flight formalities. Thus, the intended course of a mission, from a geographical point of view of a UAV in accordance with the present invention, draws a geographically based scheme of flight in all three dimensional aspects of the space. The flight plan in accordance with the present invention takes into consideration not only the course of the planned mission in geographical coordinates and flight altitude along the route, but also the availability of BSs along the routes, service providers deployed along the proposed plan, and alternatives. In such a plan, the possibility of employing an AUAV for specific sections of the plan is state in order to increase extent of service, overcome blockage or reduction in reception quality of the cellular network, etc. The consequences of the flight plan on the QoS are such that on sections of the flight plan there may be more BSs available, then in other sections. The availability of more than one cellular infrastructure along the path, may be used to prefer a specific service provider along the way, thereby switching between SIM cards available on-board the UAV, either applying a preplanned move or by an on flight decision. Further, different bandwidth requirements along the flight path may be planned ahead and be integrated in the flight plan. For example if the flight plan includes a video acquisition term from one point to another point, the bandwidth for the downlink at the specific limits is to cover the bandwidth allocation requirements at the stage.

The system may confirm the requested flight course after confirming and consider the local flight authorities regulations requested by the submitted the flight program according to the regulations and other UAVs expected and confirmed flights and after checking and verifying that the flight requested program is in allowed airspaces.

The confirmed flight plan and path in the 3D space and time can be downloaded by the 4G downlink to the UAV to be accepted by the on-board computer for further processing to control the UAV flight. This can be managed by the FDCDS (discussed below) as well. The flight control according to the downloaded flight plan can be then achieved for example by an on-board autopilot or by the remote pilot which may be a person who drives remotely the UAV.

Implementation of the current invention can increase safety of flight for large number of simultaneously flying UAVs, as well as for human life and safety of property on the ground since the availability of the UAVs flight parameters via the same payload wireless link implemented by the 4G cellular modem and link and the relatively easy addition capability of supervising and control of the UAVs that is proposed by the current concept and invention. There is no known current wireless network that is especially advantageous and able to support all the benefits as can be provided by the implementation of the current invention.

A flight data collection and distribution server (FDCDS) constitutes another aspect of the invention. The data sources and distribution targets of the server, are described schematically with reference to FIG. 4. FDCDS 82 interacts with subscribing UAVs 84, with subscribing air planes 86, with participation 4G cellular providers 88 and with aerial traffic control authorities (ATC) 90. The interaction with the UAVs 84, aero planes 86 and cellular network providers has a strong on-line aspect as they may be involved with on-going missions. The involvement with control centre 34 and ATC 90 has more off-line aspects. The purpose of having an active FDCDS is to monitor struggle over bandwidth, facilitate better planning of flight missions and prevent collisions. The FDCDS can be used as a major tool in the implementation of aerial flight control. The data about flight missions of UAVs, stored and constantly updated in database 94 can be used as a planning tool to select best flight plans. In case the FDCDS detects that a UAV is out of its confirmed flight path, in the 3-dimensional space, the FDCDS can assume control thereby setting the UAV in the original flight path. The FDCDS can also confirm or reject request for flight plan. In case the flight plan is confirmed by the FDCDS, the FDCDS can download to the UAV the confirmed flight plan and flight path including the 3D path, and reference to time. The flight plan may be downloaded by the 4G structure downlink to the on-board computer. Alternatively the UAV may receive just a confirmation number if the flight plan is already downloaded.

In a similar attitude to various levels of autopilot controlling flight parameters, the FDCDS can in cooperation with on-board computer 42 can assume control of rudder, ailerons, elevators, and the engine. Another practical option is the use of a standard purchased autopilot unit so the driving control data for the flight driving control channels as for the rudder, ailerons, elevators, and the engine. The connection of the cellular modem to such autopilot unit can enable stable and accurate flight track in various weather conditions. The flight driving control channel between the cellular modem mounted in the UAV can interface and/or use standard protocols for remote control for platforms as standard S.BUS serial data protocol or any other standard serial data wireless link protocol for remote control of platforms.

Other Autonomous Vehicles

Although the disclosure referred to hereinabove to UAVs, it should be understood that the system of the invention can be applied to other autonomous vehicles, more specifically to autonomous land vehicles and autonomous boats. With the exception that there is usually no need to implement altitude references in earth-bound missions, or at least much less in term of altitude is to take place.

Use of the System of the Invention in the Managing of UAV Fleets

The idea of using fleets of UAVs in regular haulage and dispatch missions is gaining momentum and is expected to become prevalent. The FDCDS of the present invention lends itself easily to managing such fleets together with keeping track of the consignments. The use of data relating to the flight missions obtained from a plurality of UAVs and using data from other sources such as weather models, facilitates the dynamic assignment of flight plans that can provide minimal dispatching time of parcels by UAVs of the fleets. Moreover, such plans can be dynamically calculated in-flight for optimization.

Integrative Computer on Board the UAV

As mentioned already above, computer 42 is connected to the modems and does its share in the communications of the UAV the cellular infrastructure. In addition, the same computer can be employed in the task of maneuvering the UAV by controlling the motors of the devices that direct the flight (ailerons etc.) and also it can control the power output of the propulsion engine to change the thrust, for example by controlling the fuel supply. The same computer can be implemented in the control of the various sensors including cameras on-board the UVA.

Flight Supervision

The supervision, control and management of flight in accordance with the present invention, preferably uses the FDCDS 82, may track each flight since location speed and other navigation data can become available if it is connected via the same cellular infrastructure then in case of out of course. The system can prevent deviation from an authorized course by sending limitation commands to the UAV specifically in case of risks of entrance to forbidden airspaces. To perform such supervision, automatic or non automatic, use is made of UAV telemetry and flight parameters such air and ground speed, altitude, measured on board the UAV, location by GPS and other flight parameters. The UAV uplink data sent via the 4G infrastructures may include also relevant information as left fuel or left electrical energy in the battery of the UAV in order to enable efficient and safe UAV flights.

In case of risk of physical danger to a supervised UAV that may caused by another UAV, the system can alert about the risk by sending flight driving commands in order to prevent the contention, automatically or by the human operator of the UAV or by the UAVs flight supervision and control system.

A new flight plan can be requested and confirmed during other flight plan as when there is a need to change the flight course during flight. Such supervision and control may enable in real time priority for UAVs that are in a mission of emergency services by sending alerts and other flight instructions in real time to other UAVs. Such supervision and control system may increase safety in the air and on the ground and can enable automatic by computerized and/or by human supervision as well while supplying and recording of each UAV flight details including location, speed, height, direction and other vital flight data.

The invention claimed is:

1. A system for controlling and managing a plurality of aerial or marine vehicles over a cellular network comprising:

at least one location sensor for sensing and producing a geographical location data for each of the vehicles;

at least one vehicle that is uniquely identified by an identifier and comprises the at least one location sensor and an antenna, the at least one vehicle being configured to transmit, over the cellular network the geographical location data and the identifier, or to receive, over the cellular network, messages that include control commands and to execute the control commands;

a server computer device configured to receive, over the cellular network, the geographical location data, and to store the geographical location data, and to transmit, over the cellular network, at least part of the messages comprising the control commands, wherein the control commands are based on the geographical location data received from the at least one vehicle and from at least one additional vehicle; and a modem coupled to the antenna of the at least one vehicle, configured for communicating with the server computer device over the cellular network;

wherein the cellular network uses, or is compatible with, a cellular network that provides a promised data rate, provides a promised latency, uses an ensured connection reliability protocol, uses a Quality-of-Service (QoS) protocol, or any combination thereof, wherein modem supports the promised data rate of at least 42 Mb/s per link, the promised latency, the ensured connection reliability protocol, the QoS protocol, or any combination thereof, or wherein the server computer device communicates with the at least one vehicle and with at least one additional vehicle over the cellular network using a respective direct link to each of the vehicles, that provides the promised data rate, the promised latency, uses an allocated bandwidth, or any combination thereof.

2. The system of claim 1, wherein the system is for use with at least one flight plan that comprises a three-dimensional route defined by altitude and geographical coordinates, wherein the at least one flight plan is stored in the at least one vehicle, and wherein the at least one vehicle is configured to follow the at least one flight plan, wherein the at least one flight plan of the at least one vehicle is stored in the server computer device, and wherein the server computer device is configured to transmit, over the cellular network, the at least one flight plan of the at least one vehicle to the at least one additional vehicle to be stored thereon.

3. The system of claim 1, wherein the geographical location data comprises navigational information, ground speed, altitude, directions, or any combination thereof, wherein the at least one location sensor comprises a gyroscope, an accelerometer or an inertial sensor, wherein the at least one location sensor comprises a Global Positioning System (GPS) sensor, wherein the geographical location data is based on triangulation of signals received from at least two base stations of the cellular network, wherein the cellular network identifies the aerial vehicle location, wherein the cellular network identifies the aerial vehicle location providing a navigational information for the aerial vehicle, wherein the base station antenna is a directional antenna or points upwards, wherein the at least one vehicle further comprises an autopilot that is configured for executing a flight plan by using the geographical location data, wherein the at least one vehicle, comprises an additional sensor for sensing and providing additional sensor data, and wherein the at least one vehicle is configured to transmit, over the cellular network, the additional sensor data to the server computer device or to a working station, wherein the additional sensor comprises a camera, wherein the camera uses still image data, video data, thermal InfraRed (IR) data, forward looking InfraRed (FLIR), or any combination of thereof, wherein the additional sensor comprises a Radio Detection And Ranging (RADAR) device, wherein the additional sensor, comprises a meteorological sensor, or an environmental sensor, wherein the meteorological or environmental sensor, comprises a thermometer, a pressure gauge, a humidity gauge or any combination of thereof, wherein the additional sensor, comprises a fuel level, a battery energy level or any combination of thereof, wherein the additional sensor data, comprises a fuel level or a battery energy level or any combination of thereof, wherein the additional sensor data comprises still image data, video data, thermal InfraRed (IR) data, forward-looking InfraRed (FLIR) data, or any combination of thereof, wherein the at least one vehicle is further configured to transmit, over the cellular network, the additional sensor data to an additional computer device, or to upload, over the cellular network, the additional sensor data to the Internet cloud.

4. A method for controlling and managing a plurality of aerial or marine vehicles by a server computer device over a cellular network, the method comprising:

receiving geographical location data, by the server computer device from a first aerial or marine vehicle and from at least one additional aerial or marine vehicle over the cellular network;

storing, in the same server computer device, the received geographical location data; and transmitting messages comprising control commands based on the received geographical location data of the aerial or the marine vehicles, by the same server computer device to at least one of the aerial or marine vehicles over the cellular network, wherein the cellular network uses, or is compatible with, a standard a Long-Term-Evolution (LTE) network that is compatible with the International Telecommunication Union (ITU) International Mobile Telecommunications Advanced (IMT-Advanced) program, or a cellular network that provides a promised data rate, provides a promised latency, uses an ensured connection reliability protocol, uses a Quality-of-Service (QoS) protocol, or any combination thereof, and wherein the server computer device communicates with the first aerial or marine vehicle and the at least one additional aerial or marine vehicle over the cellular network using a respective end to end direct link to the aerial or marine vehicles, that provides the promised data rate, provides the promised latency, uses an allocated bandwidth, or any combination thereof, or wherein the first aerial or the marine vehicle and the at least one additional aerial or marine vehicle are uniquely identified.

5. The method of claim 4, wherein the server computer device is ground-station based, wherein the server computer device is part of, or comprises, a Flight Data Collection and Distribution Server (FDCDS), wherein the method further comprises communicating, by the server computer device, with at least one airplane, with a cellular network provider, with a weather model provider, or any combination thereof, wherein the method further comprises communicating, by the server computer device, with an Aerial Traffic Control (ATC) authority, wherein the method further comprises communicating in real-time, by the server computer device, with the airplane, the cellular network provider, the weather model provider, the ATC authority, or any combination thereof, or wherein the method, further comprises communicating in real-time, by the server computer device, with the aerial or marine vehicles.

6. The method of claim 4, wherein at least one of the aerial or marine vehicles is an Unmanned Aerial Vehicle (UAV) or an Unmanned Marine Vehicle (UMV).

7. The method of claim 4, further comprising storing, by the server computer device, a flight plan that comprises a three-dimensional route defined by altitude and geographical coordinates, wherein the method, further comprises transmitting, by the server computer device to at least one of the aerial or marine vehicles over the cellular network, the flight plan to be stored thereon.

8. The method according to claim 4, wherein the method, further comprises:

comparing, by the server computer device, the geographical location data with a flight plan; and transmitting, by the server computer device to at least one of the aerial or marine vehicles over the cellular network, messages comprising control commands in response to detecting risk of entrance to forbidden or limited airspace or collision with other aerial or a marine vehicles;

communicating, by the server computer device, with an Aerial Traffic Control (ATC) authority; and transmitting, by the server computer device to the ATC authority, the flight plan, wherein the control commands are transmitted in response to receiving an approval to the flight plans from the ATC authority.

9. The method of claim 7, wherein the control commands direct the respective aerial or marine vehicle according to the respective flight plan, and wherein the control commands direct or control a rudder, ailerons, elevators, a propulsion engine or motor or any combination of thereof, in the respective aerial or marine vehicle.

10. The method of claim 4, wherein the geographical location data comprises navigational information, ground speed, altitude, directions, or any combination thereof, wherein at least one of the aerial or marine vehicles is configured for uploading the respective geographical location data and the respective identifier to the Internet cloud, wherein at least one aerial or marine vehicles further comprises an additional sensor for sensing and producing additional sensor data, the method further comprising receiving the additional sensor data, by the server computer device from the at least one aerial or marine vehicle over the cellular network, wherein the additional sensor comprises a camera, wherein the additional sensor data comprises still image data, video data, thermal InfraRed (IR) data, forward-looking InfraRed (FLIR) data, or any combination of thereof, wherein the additional sensor comprises a Radio Detection And Ranging (RADAR) device, wherein the additional sensor is a meteorological sensor or an environmental sensor, wherein the meteorological or environmental sensor comprises a thermometer, a pressure gauge, a humidity gauge or any combination of thereof, wherein the additional sensor data comprises a fuel level or a battery energy level.

11. An aerial vehicle configured to communicate over a cellular network, the aerial vehicle comprises:

at least one location sensor for sensing and producing a first geographical location data; and an antenna, and a modem coupled to the antenna of the aerial vehicle, configured for communicating over the cellular network;

wherein the aerial vehicle is uniquely identified by an identifier;

wherein the aerial vehicle is configured to transmit, over the cellular network, to a server computer device or to at least one additional aerial vehicle, a first geographical location data and an identifier;

wherein the aerial vehicle is configured to receive, over the cellular network, a geographical location data of at least one additional aerial vehicle;

wherein the aerial vehicle is configured to receive, over the cellular network from the server computer device or from the at least one additional aerial vehicle, messages that include alerts or control commands according to the first geographical location data and according to the at least one additional vehicle geographical location data;

wherein the aerial vehicle is configured to execute the control commands;

wherein the cellular network uses, or is compatible with, a cellular network that provides a promised data rate, provides a promised latency, uses an ensured connection reliability protocol, uses a Quality-of-Service (QOS) protocol, or any combination thereof, and wherein the aerial vehicle is configured to communicate over the cellular network using a link that provides the promised data rate, provides the provides promised latency, uses an allocated bandwidth, or any combination thereof.

12. The aerial vehicle according to claim 11, wherein the first geographical location data comprises navigational information, ground speed, altitude, directions, or any combination thereof, wherein the at least one location sensor comprises a gyroscope, an accelerometer or an inertial sensor, wherein the at least one location sensor comprises a Global Positioning System (GPS) sensor, wherein a second geographical location data is based on triangulation of signals received from at least two base stations of the cellular network, wherein the cellular network identifies the aerial vehicle location, wherein the aerial vehicle navigates according to the location identification provided by the cellular network, wherein the aerial vehicle further comprises an autopilot that is configured for executing a flight plan by using the first geographical location data or the second geographical location data, wherein the aerial vehicle, comprises an additional sensor for sensing and providing a sensor data, wherein the aerial vehicle is configured to transmit respective additional sensor data over the cellular network, wherein the additional sensor comprises a camera, wherein the camera uses still image data, video data, thermal InfraRed (IR) data, forward looking InfraRed (FLIR) data, or any combination of thereof, wherein the additional sensor comprises a Radio Detection And Ranging (RADAR) device, wherein the additional sensor, comprises a meteorological sensor or an environmental sensor, wherein the meteorological or environmental sensor comprises a thermometer, a pressure gauge, a humidity gauge or any combination of thereof, wherein the additional sensor, comprises a fuel level, a battery energy level or any combination of thereof, wherein the additional sensor data, comprises a fuel level or a battery energy level or any combination of thereof, wherein the additional sensor data, comprises still image data, video data, thermal InfraRed (IR) data, forward-looking InfraRed (FLIR) data, or any combination of thereof, and wherein the aerial vehicle is further configured for uploading the sensor data or the additional sensor data to a virtual database, or wherein the aerial vehicle is further configured for uploading the first geographical location data and the identifier to the virtual database.

13. The aerial vehicle of claim 11, wherein the aerial vehicle is an Unmanned Aerial Vehicle (UAV).

14. The aerial vehicle of claim 11, wherein the aerial vehicle further comprises a second antenna and a second modem coupled to the second antenna of the aerial vehicle, configured for communicating over the cellular network, wherein the first and second modems of the aerial vehicle are connected for extending bandwidth or redundancy, or wherein the first antenna comprises an omnidirectional antenna and the second antenna comprises a unidirectional antenna.

15. The aerial vehicle of claim 14, wherein the aerial vehicle is configured to search for and select a first base station (BS) based on a signal strength associated with the first BS, wherein the aerial vehicle is configured to direct the unidirectional antenna to the first BS, and wherein the aerial vehicle is configured to search for and select an additional BS based on a signal strength associated with the additional BS received by the omnidirectional antenna, or wherein the aerial vehicle is configured to search for and select an additional BS based on a signal strength associated with the additional BS.

16. The aerial vehicle of claim 11, further comprising a first and a second Subscriber Identity Module (SIM) for subscriber access to an additional cellular network, wherein the aerial vehicle, is configured to simultaneously communicate over the cellular network and the additional cellular network, or wherein the aerial vehicle comprises a second antenna and a second modem coupled to the second antenna of the aerial vehicle, configured for communication over the additional cellular network or further configured to simultaneously communicate over the cellular network and additional cellular network, or wherein the aerial vehicle is configured to shift communications from the cellular network to the additional cellular network.

17. The aerial vehicle of claim 11, wherein the aerial vehicle is further configured to execute the control commands to direct the aerial vehicle according to a flight plan, and wherein the control commands direct or control a rudder, ailerons, elevators, a propulsion engine or motor or any combination of thereof, in the aerial vehicle.

18. The aerial vehicle of claim 11, wherein the aerial vehicle is configured to communicate with the server computer device or with the at least one additional aerial vehicle over a direct end to end link of the cellular network.

19. The aerial vehicle of claim 11, wherein the first modem supports the promised data rate of at least 42 Mb/s per link.

20. An Auxiliary Unmanned Aerial vehicle (AUAV) configured to extend a cellular network geographical limitations of the cellular system for communication with an aerial vehicle or a marine vehicle, the AUAV comprises:

a required hardware for creating a cellular cell or microcell or a Pico cell of the cellular network;

wherein the aerial vehicle or the Marine vehicle comprises:

an antenna, and a modem coupled to the antenna, configured for communicating over the cellular network;

wherein the aerial vehicle or the Marine vehicle is uniquely identified by an identifier, wherein the aerial vehicle or the Marine vehicle is configured to transmit, over the cellular network, to a server computer device or to at least one aerial vehicle, a first geographical location data and an identifier.

* * * * *